United States Patent [19]

Finkemeyer et al.

[11] 4,047,244
[45] Sept. 6, 1977

[54] MICROPROGRAMMED DATA PROCESSING SYSTEM

[75] Inventors: Karl-Friedrich Finkemeyer, Gaertringen; Kuno M. Roehr; Guenther Sonntag, both of Boeblingen, all of Germany

[73] Assignee: International Business Machines Corporation, Armonk, N.Y.

[21] Appl. No.: 687,831

[22] Filed: May 19, 1976

[30] Foreign Application Priority Data

Oct. 23, 1975 Germany .................... 2547488

[51] Int. Cl.² .................... G06F 9/10; G06F 13/00
[52] U.S. Cl. .................... 364/200
[58] Field of Search .................... 340/172.5; 445/1; 364/200, 900

[56] References Cited

U.S. PATENT DOCUMENTS

| | | | |
|---|---|---|---|
| 3,284,776 | 11/1966 | Freedman | 340/172.5 |
| 3,593,299 | 7/1971 | Driscoll | 340/172.5 |
| 3,766,532 | 10/1973 | Liebel | 340/172.5 |
| 3,771,141 | 11/1973 | Culler | 340/172.5 |
| 3,878,513 | 4/1975 | Werner | 340/172.5 |
| 3,893,084 | 7/1975 | Kotok et al. | 340/172.5 |
| 3,906,457 | 9/1975 | Mattedi et al. | 340/172.5 |
| 3,986,171 | 10/1976 | Spoelder | 340/172.5 |

*Primary Examiner*—Mark E. Nusbaum
*Attorney, Agent, or Firm*—Harry T. Berriman

[57] ABSTRACT

Storage hierarchy comprising a main store with user and program data (L), a control store with micro code (C), and a processor buffer store which is commonly used for both data types (L & C). With no restrictions imposed, allocation of buffer space for L and C type data is self-adapting, since the address and replacement array are used jointly for both types of data.

Alternatively, to reserve at least a minimum amount of buffer space for L and C type blocks, respectively, one or two space limit values may be defined and adhered to each time buffer block space is allocated anew. Thus the buffer space may be shared by the two types of data either in a fully overlapping (no space limit values), in a partly overlapping (two space limit values) or in a non-overlapping manner (one space limit value).

9 Claims, 7 Drawing Figures

MICROPROGRAMMED DATA PROCESSING SYSTEM

STATEMENT OF THE INVENTION

The invention relates to a microprogrammed data processing system with a main store for user data and macro instructions and a control store for micro instructions, as well as a processor connected to both stores.

BACKGROUND OF THE INVENTION

Modern data processing system are increasingly required to store great quantities of data in the main store, which must thus be readily accessible. As high-speed and large-scale storages are very expensive, the tendency is to design storage hierarchies with different actuality levels, whose average speed corresponds to that of a high-speed, expensive storage. It is known in this connection to provide a high-speed, small-scale buffer store between the main store of the system and the processor. The cycle time for the main store, which in this case may also be referred to as a back-up store, is, for example 1 to 5 microseconds and for the high-speed buffer store 300 ns. Thus for the complete hierarchy an access time is obtained which is slightly above the cycle time of the high-speed buffer store but considerably below that of the main store.

However, the use of a high-speed buffer store gives rise to a number of problems which are essentially connected with the choice of suitable parameters, such as buffer size, associativity, replacement strategy, etc. Associativity in this connection refers to the way in which main store locations can be mapped onto buffer store locations. Generally, for example, provisions may be made for a main store data area to be storable everywhere in the buffer store, thus ensuring full associativity. However, in order to locate the data area in the buffer store, a buffer address array has to be provided which indicates the respective buffer store location for each data area or partition. It is clear that this buffer address array becomes very extensive in this general case and necessitates complicated control devices. The system is rendered simpler when a particular data area can be stored only within given geometrical boundaries of the buffer store. Such limited associativity considerably facilitates the addressing of the buffer address array and the job of determining whether a particular data area is available in the buffer store at a given time.

As buffer stores by their very nature are such that they can accommodate only a part of the main store data, it is frequently necessary to remove an old area from the buffer store before a new data area or partition can be stored. The choice of the old area is made by means of a replacement array which as a function of the given associativity indicates an area suitable for replacement. The area is replaced in accordance with different algorithms, of which the FIFO (First In First Out) algorithm and the LRU (Least Recently Used) algorithm are those most commonly known. From the various data areas to be considered the FIFO algorithm chooses that area which was the first to be read into the buffer store, whereas the LRU algorithm selects the least recently used area.

It stands to reason that not so much the small-scale, high-speed buffer store as the control means necessary for its use, such as the buffer address array, the replacement array, and the update logic for the replacement array, involve considerable expenditure. Apart from the hardware cost, each addressing of the buffer store necessitates an addressing of the control means, which may be very time-consuming.

However, not only the user data and macro instructions but also the micro instructions of a microprogrammed data processing system, which are on the increase, call for larger micro instruction control stores. As the cost of more recent data processing have been increasingly software influenced, the tendency is to replace pure software elements by microprogram functions. In connection with virtually addressed storage hierarchies, the elements concerned may be related to storage management, multiprocessing aspects connected with jobs to be handled, source allocation, etc. The reasons for this switch from software to hardware may be summarized as follows:

greater effectiveness, since the problems to be solved are more hardware related, greater flexibility within a compatible series of computers, in that elements enhancing the efficiency of the system are hardware implemented, greater ease of use as a result of a greater number of automatisms, and simpler and thus more reliable operating system.

However, such a switch may increase the size of the microprogram to 1 megabyte. It is obvious that microprograms of that size can no longer be kept readily accessible in a high-speed storage. Whereas previously, for speed reasons, the micro instructions were stored in read-only stores, large-scale microprograms necessitate a different approach. Attempts have also been made (see, for example, U.S. Pat. No. 3,478,322) to store the the microprogram in writable stores. Megabyte microprograms necessitate, however, the use of a storage hierarchy. Such a hierarchy is known, for example, from U.S. Pat. No. 3,800,291 commonly owned by the assignee of the subject application. But also in this patent the use of a high-speed buffer store for micro instructions involves the disadvantages described above in conjunction with a buffer store employed for user data. The optimum buffer size, the associativity, etc. are difficult to determine, and the control means required (buffer address array, replacement array, control logic) constitute a substantial cost factor. Apart from this, the optimum buffer store parameters cannot be determined when the system is designed, since they are governed to a considerable degree by the application to which the system is put by the user.

The cost of the control means for different buffer stores is furthermore increased substantially by data processing systems designed as multiprocessing systems, since in such a case each processor requires separate control means and the control means as such are rendered complicated by the multiprocessor operation and the data actuality this entails in each of the buffer stores.

In spite of the obviously increased expenditure, user data and macro instructions on the one hand and micro instructions on the other were previously transferred to the processor along strictly separated paths. The reason for this was that the two types of data concern two entirely different types of information. To transfer the two types of information, buses are provided which are different with regard to the quantity of data to be transferred and the transfer speed.

Whereas the difference between user data and micro instructions is obvious, the difference between macro instructions on the one hand and micro instructions on the other will be described in detail below. Macro instructions and data are stored jointly essentially because modern data processing systems necessitate that they be handled in the same manner. This means more specifically that it must be possible for such instructions and data to be processed and modified in the same manner, thus rendering the execution of the programs and program branches, if any, flexible. However, in the case of the micro instructions conditions are entirely different. As micro instructions constitute a so-called interpreting code, the application of the Neumann principle described above, i.e., the joint storage of data and macro instructions in the main store and the instruction modifications, would not facilitate the programming techniques employed. Therefore, most data processing systems comprise different storages for macro instructions and data on the one hand and micro instructions on the other. If for cost reasons joint storage is provided for, such a storage contains two logically separated address spaces for the two different types of information (see, for example, IBM TDB May 1973, page 3799).

Thus the solutions described above for making great numbers of microprograms readily accessible are unsatisfactory because of the high cost involved. This high cost is essentially attributable to the requirement of having to provide two separate transfer paths for transferring the two types of information to the processor. Although such separate paths are in many cases advantageous from the time standpoint, since both paths can be used simultaneously, the double expenditure and in the case of multiprocessors the more than double expenditure becomes unacceptable for small and medium scale data processing systems.

SUMMARY OF THE INVENTION

Therefore, it is the object of the invention to permit the processor to readily access great numbers of microprograms and to reduce the cost of the equipment necessary for this purpose.

The solution in accordance with the invention is described in the characterization of the main claim.

As the processor and the control store are connected via a buffer store, the micro instructions are rendered readily accessible. However, since the buffer store is used jointly for both types of information, i.e. for the user data and the macro instructions on the one hand and the micro instructions on the other, and since the control units, too, are used jointly, the cost is essentially reduced. The joint use of the buffer store also ensures that it is more effectively utilized.

A preferred embodiment of the invention is characterized in that limits of defining address spaces in the buffer store are stored in two registers provided for that purpose. This leads to a further improvement which permits using the space in the buffer store in a fully or partly overlapping or a strictly separated, i.e., non-overlapping, manner with respect to the types of information to be handled. As both types of information use the same control units, the space available adapts itself automatically when the buffer store areas provided for the two types of information overlap. At the same time storage space is made available in the overlapped area of the buffer store for that type of information that is the first to require storage space. On the other hand, the partial overlapping ensures that neither information type monopolizes the buffer store. This means that at least a partial area of the buffer store is reserved for each of the two information types. The two limit address registers can be loaded by means of the microprogram or the user program, so that the allocation of the storage space is rendered highly flexible and can be adapted to special user programs.

A further advantageous embodiment of the invention concerns the partly associative mapping of the main store onto the buffer store. To this end the buffer store, for example, can comprise a certain number of columns, and the maximum number of columns in which information of a particular type may be stored can be specified in the limit address registers. This substantially simplifies the organization of the replacement array, the buffer address array, and the control logic.

The buffer store can be advantageously organized in such a manner that a particular number of data areas or partitions are stored in one column. This associativity simplifies the layout of the buffer address array, the replacement array, and the control logic, since the area address simultaneously denotes the address of the respective line in these arrays.

Further preferred embodiments of the invention may be seen from the remaining subclaims.

BRIEF DESCRIPTION OF THE DRAWINGS

FIG. 6 shows the operation of a replacement array in accordance with the FIFO algorithm, and FIG. 7 shows the operation of a replacement array in accordance with the LRU algorithm

EMBODIMENT OF THE INVENTION

Figure 1:
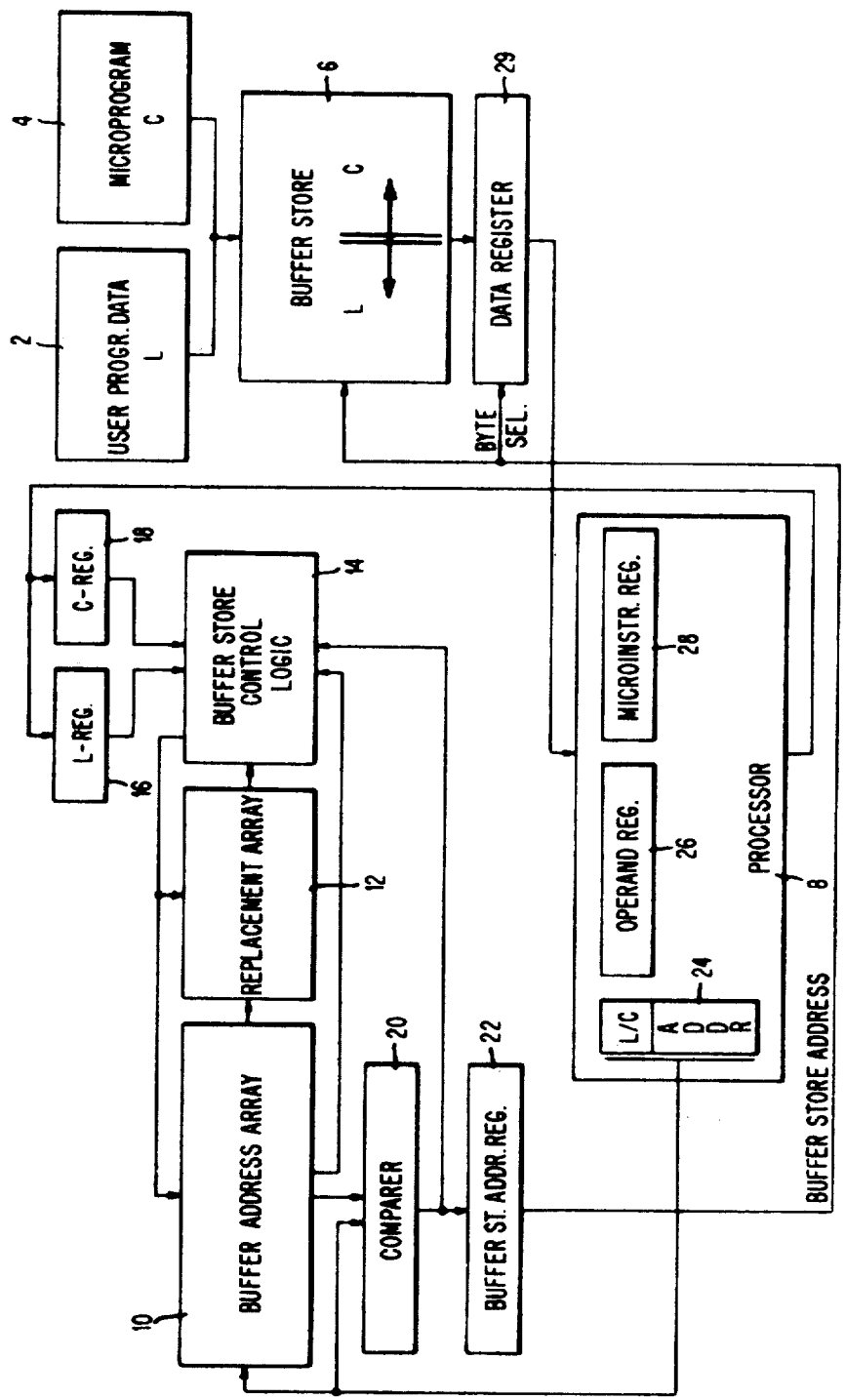
FIG. 1 is a block diagram of a data processing system with the storage hierarchy in accordance with the invention.

FIG. 1 is a general representation of a data processing system with a storage hierarchy, in which elements, such as the input/output units, that are inessential for appreciating the data processing system in accordance with the invention have been omitted. The system as shown comprises a back-up store 2 for the user program consisting of the macro instructions and the data necessary for processing this program. A further back-up store 4 is provided for the microprogram. The information type in store 2 is referred to as L and the information type in store 4 as C. The back-up stores 2 and 4 are stores known as main stores in data processing systems. In most cases these stores are designed as magnetic core storages or as monolithic storages.

The information of one type of the other is fed to the processor 8 via a buffer store 6 common to the two types of information L and C. The capacity of the buffer store 6 can be used by both types of information either in a fully overlapping manner or, as indicated in FIG. 1, one several variable boundaries limiting the storage space available for each information type can be provided in buffer store 6. Depending upon the type of the information required, this is loaded in the processor either into the operand register 26 or into the micro instruction register 28. The two types of information are distinguished by a bit in the address supplied by the processor. This bit is referred to as L/C.

By means of the address made available by processor 8 in register 24 and serving to address the buffer store, initially a buffer address array 10 is interrogated to determine whether the data specified by this address are in the buffer store. This information is supplied by a comparer 20, by means of which the address necessary for addressing the buffer store is loaded into the buffer store address register 22. If only a single byte is required from the buffer store, the corresponding low order part of the buffer store address can be used to select one or several bytes in data register 29 into which the data from buffer store 6 are to be read.

If the required data are not available in the buffer store, they have to be fetched from the corresponding back-up store 2 or 4, clearing, if necessary a suitable storage location in buffer store 6. The replacement array 12 in connection with the buffer store control logic 14 is used to indicate the storage location to be cleared.

As generally both types of information L and C are stored in buffer store 6, it may be necessary to observe certain boundaries when a data area is replaced. If data of the L type may be stored only in one particular area of the buffer store 6 and data of the C type may be stored only in another particular area, replacement has to be carried out in such a manner that each time fresh data of a particular type are to be transferred to buffer store 6 only data of the same type are replaced. The L register 16 and the C register 18 serve to indicate the boundaries to be observed for this purpose. When the replacement information provided by the replacement array 12 is evaluated, the boundaries stored in these registers are taken into account by the buffer store control logic 14.

A more detailed description of the operation of the units shown in FIG. 1 will be given below by means of FIG. 2.

If no geometrical boundaries are given for mapping the data from the back up stores 2 and 4 into the buffer store 6, the two registers 16 and 18 can store boundaries in a general form, so that the buffer store 6 is extremely flexibly divided between the two types of information L an C.

A more detailed description of the mapping conditions of the main and the buffer store, the organization of the buffer address array and the replacement array, and the algorithms that may be employed is contained in U.S. Pat. Nos. 3,588,829 and 3,569,938 commonly owned by the assignee of the subject application. These patents also refer to the arrangements necessary for transferring data between the main store and the buffer store.

Figure 2:
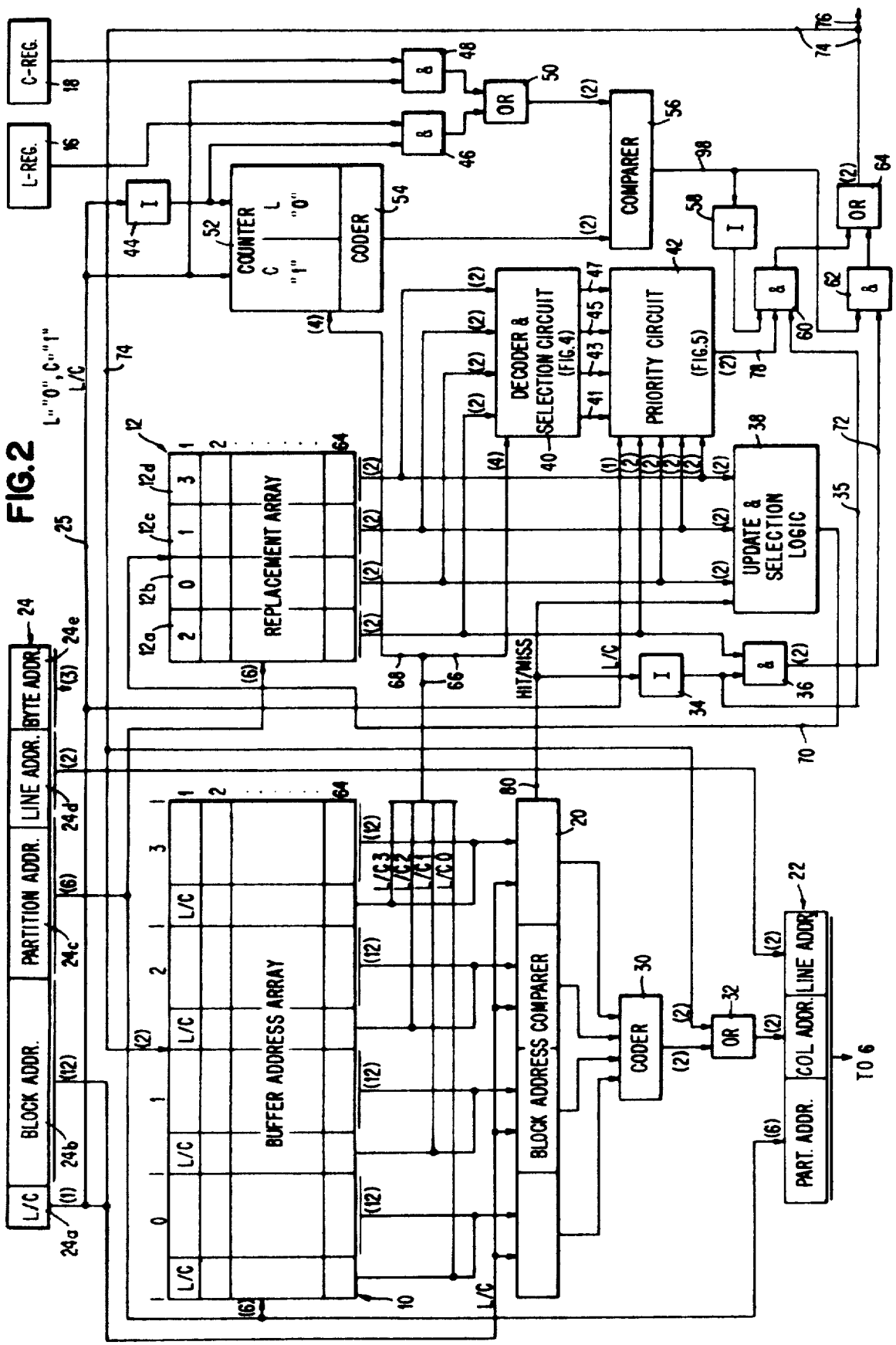
FIG. 2 is a more detailed representation of the arrangement shown in FIG. 1.

The arrangement shown in FIG. 1 is illustrated in greater detail in FIG. 2. FIG. 2 shows in particular that equipment which results from the joint use of the buffer store 6 for the two data types L and C. Of the elements shown in FIG. 1, FIG. 2 again shows the buffer address array 10 and the replacement array 12, as well as the comparer 20. The buffer store control logic referred to as 14 in FIG. 1 is shown in greater detail in FIG. 2, being essentially represented in the right part of the figure. This logic will be described in detail below. But the latter description will be preceded by a description of how the buffer store is addressed. The numbers in brackets denote the number of bits on the respective line or in the respective part of the register.

The address made available by processor 8 is loaded into register 24 and comprises 24 bits. In detail the address is made up of the following fields:

In field 24a a bit is stored which will hereafter be referred to as L/C bit. This bit indicates whether the data requested by the processor are of the L or the C type.

In field 24b a block address is stored which consists of 12 bits, so that 4k blocks can be addressed by the processor.

In field 24c an area address comprising 6 bits is stored, so that 64 areas can be addressed in each block.

In fields 24d and 24e a line address and a bit address is stored, whose significance will be described in detail in connection with FIG. 3.

FIG. 2 shows that the buffer address array 10 and the replacement array 12 each comprise 4 columns. The columns of array 10 are designated as 0 to 3, whereas the columns of array 12 are designated as 12a to 12d. In each column of array 10 an L/C bit and a block address are stored in a line. In each line in the replacement array 12 the four column number 0 to 3 of the buffer address array 10 are stored from left to right in the sequence in which the respective columns are to be replaced. For this purpose the column number that is the next to be replaced can be contained in column 12a.

The organization of buffer store 6 and its addressing will be described in detail below by means of FIG. 3.

Figure 3:
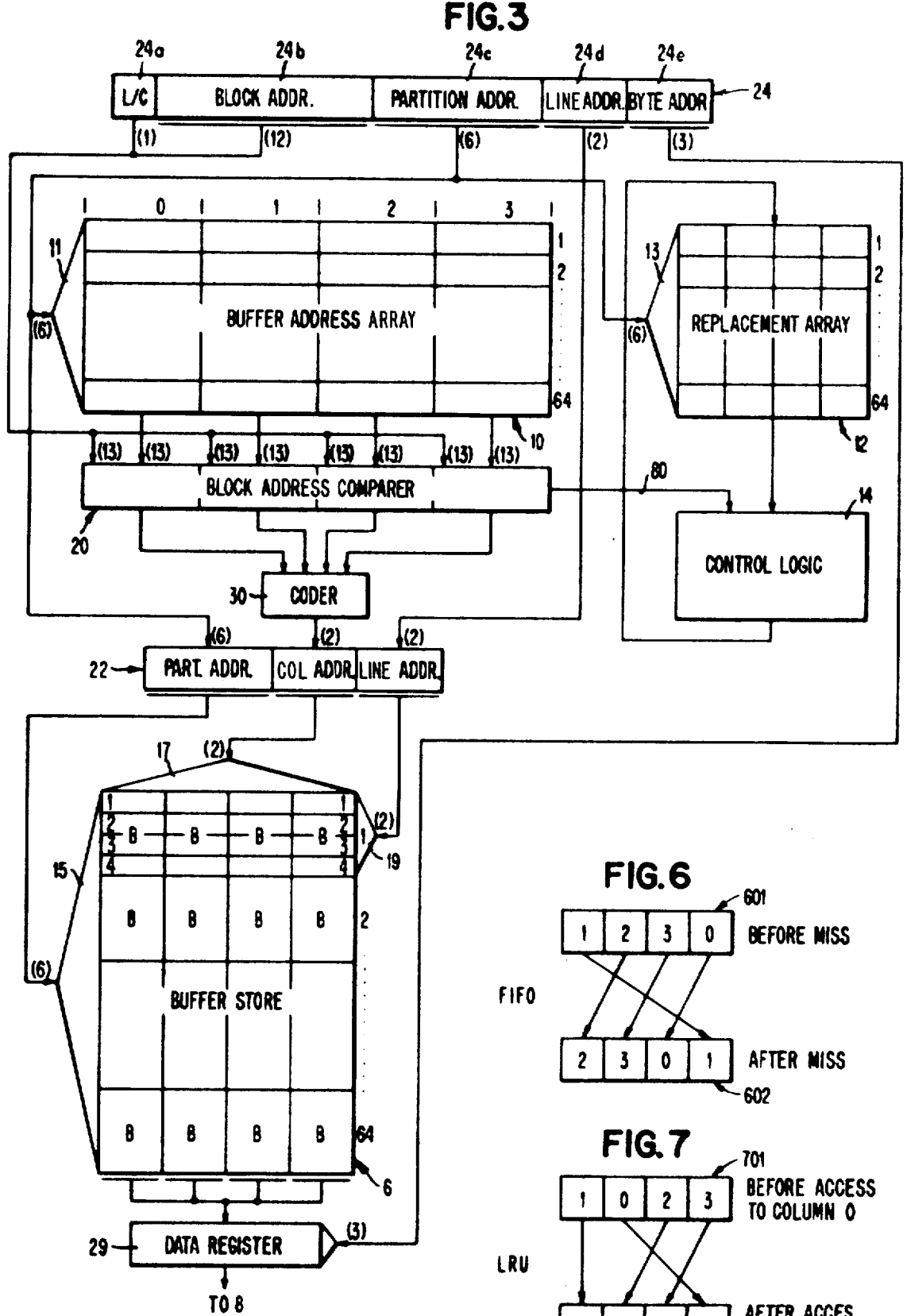
FIG. 3 shows the addressing paths of the storage hierarchy.

In accordance with the organization shown in FIG. 3, four-way associativity is provided for storing data areas or partitions from the back-up store in the buffer store 6. Thus the buffer store 6, the buffer address array 10, and the replacement array 12 are organized in four (N) columns. In the buffer store one data area B each can be stored in a column in 64 area rows, whereby a single data area has four lines which are shown in the buffer store 6 of FIG. 3 in the first area row at the top. In accordance with the 64(M) rows in a column of the buffer store, the buffer address array 10 and the replacement array 12 dach have 64(M) lines or rows. When a data area is stored in a particular column in the buffer store, its block number is stored in the corresponding column and line in the buffer address array 10. If, for example, area 15 is stored in column 2 of the buffer store, the block number of this area together with the L/C bit appears also in the address array 10 in column 2, namely in the 15th line.

This has the advantage that by means of the area address in field 24c both a line of the buffer address array 10 and a particular area row in the buffer store 6 can be addressed. To this end address decoders 11 and 15 are provided. One of the four lines in the required area is addressed by means of the line address in field 24d and the address decoder 19. Each of these four lines of the data area comprises, for example, eight data bytes which are read parallel into the data register 29. Depending on the width of the transfer paths to the processor, a single byte of these eight bytes can be selected by means of a 3-bit byte address stored in field 24e.

To determine whether a particular data area is available in the buffer store, the block address pertaining to this area is compared with the block addresses stored in the buffer address array. As the block addresses pertaining to a particular area, for example, area 15, can only be stored in a single line, in this case in the 15th line of array 10, this comparison can be readily made. To this end the corresponding block addresses are read from array 10 into comparer 20 where they are compared parallel with the block address of the processor. If the comparison yields a concurring result, the comparer 20 emits a corresponding signal on its output 80. Simultaneously, the corresponding column is determined by a coder 30, the latter generating the 2-bit column address corresponding to this column, which is loaded into the corresponding field of the buffer store address register 22. Subsequently, the column and data area row required can be addressed via address decoders 17 and 15. The line required in this area is selected by address decoder 19.

If the comparison does not yield a concurring result (HIT) but a negative one (MISS), this means that the area required is currently not available in the buffer store and has to be fetched from the main store into the buffer store. To this end a suitable area from buffer store 6 has to be transferred back to the back-up store in replacement. If the area concerned contains micro instructions, this transfer step is eliminated, since generally micro instructions are not changed or modified by the processor. In connection with this transfer step it is known to store a validity and a change bit for each block address in the buffer address array, said bits indicating whether the respective information is still valid or has been changed. Depending upon these control bits, the transfer step back to the back-up store can also be omitted for type L data.

If the comparer 20 indicates by a MISS signal on its control output 80 that a data area in the buffer store 6 has to be replaced, logic 14 determines by means of the information stored in replacement array 12 in which column of the buffer store the corresponding area has to be replaced. The corresponding line in arrays 10 and 12 and in the buffer store is given by the area address together with the address decoders 11, 13, and 15.

With regard to the replacement strategy, several algorithms have become known, of which only the FIFO (First In First Out) algorithm and the LRU (Least Recently Used) algorithm will be described below by means of FIGS. 6 and 7. In accordance with the FIFO algorithm, of the four data areas to be considered, the area with the block number that was the first to be read into the address array 10 has to be replaced. To this end the update and replacement logic 38 of FIG. 2, which is part of logic 14 shown in FIG. 3, transfers the column number 0 to 3 stored in column 12a of the replacement array to column 12d each time a MISS signal 80 is emitted, and the remaining column numbers in this line are shifted to the left by a signal on line 70. When a column is replaced the corresponding column number is put at the end of the chain and is again considered after three further shifts. Block 601 of FIG. 6 shows the contents of the corresponding line of the replacement array 12 prior to the MISS signal 80 and block 602 the contents of this line after shifting. In the case described, the area of that block is replaced whose block number is stored in column 1 of the address array 10, and the next area to be considered is that whose block number is stored in column 2 of array 10.

In the case of the LRU algorithm, however, the contents of the replacement array 12 have to be updated after each addressing of the buffer store. To this end the number of the column referred to is put at the end of the chain shifting, if necessary, the remaining column numbers to the left. Thus in a line of the replacement array the column number on the far right denotes the column that was most recently used and the column number in the chain on the far left the column that was least recently used and which should be replaced, provided that the information type of the area concerned is of no importance.

Block 701 in FIG. 7 shows the contents of the line in the replacement array 12 corresponding to the area address before column 0 in buffer store 6 is accessed and block 702 the contents of this line after said column has been accessed. If the comparer 20 generates a MISS signal the corresponding line in array 12 is additionally shifted one position to the left, whereby the column number in column 12a is stored in column 12d.

The embodiment shown in FIG. 3 concerns a buffer store with, for example, 8k bytes, as in each of the four columns of the buffer store 64 areas each comprising four lines are stored, whereby each of these lines of an area can store eight bytes. The storage sizes shown and in particular the 4-way associativity chosen for the embodiment merely serve as examples to show that relatively expensive control elements are necessary for operating such a buffer store. If the data from the back-up store are to be mapped on the buffer store without any restrictions, meaning that any area must be storable in any line and column of the buffer store, a correspondingly complicated buffer address array and a replacement array have to be provided to ensure full associativity.

The joint use of the buffer store 6 for data from both back-up stores 2 and 4 will be described below by means of FIG. 2. Buffer store 6 can be initally loaded, for example, in such a manner that for a particular area number the columns are filled left to right. If subsequently the processor 8 shown in FIG. 1 loads an address into the address register 24 it simultaneously indicates whether a read or write operation in buffer store 6 is required. The above-mentioned change bit is set during writing, whereas, for example, during multiprocessor operation the validity bit can be set by other processors.

As the data requested from processor 8 can be data of the L or the C type, it is insufficient to determine by means of the buffer address array 10 and the comparer 20 whether the block address stored in field 24b of register 24 is stored in the addressed line of array 10. In addition, it is necessary rather to determine whether the L/C bit in field 24a and the L/C bit stored for the same block address in the addressed line of array 10 concur. Thus the corresponding 13 bits in fields 24a and 24b of the buffer store address are compared parallel with the 13 bits of each of the columns 0 to 3 of array 10. The comparer 30 emits a HIT/MISS signal on its output 80. In the case of a HIT, coder 30 generates the corresponding column address, loading the same into buffer address register 22 via OR gate 32.

In the case of a HIT, the buffer store is addressed, and the replacement array 12 is updated by the update and replacement logic 38, depending upon the replacement algorithm selected.

If the comparison yields a negative result and a MISS signal is generated on line 80, a data area in buffer store 6 has to be replaced. As buffer store 6 is used jointly for L and C type data, the replacement depends on whether an L or a C area is required and on whether any restrictions exist with regard to dividing the storage space for the two types of information.

With regard to the joint use of buffer store 6 for both information types L and C, several cases have to be distinguished between. In a general case the whole buffer store 6 can be used jointly by both information types. If, for exmaple, a micro instruction area is requested, an area is cleared depending upon the replacement algorithm adopted, and the requested area is loaded into buffer store 6.

However, this may lead to the information type needed more frrequently pushing the other type out of the buffer store 6, thus monopolizing the storage space. Thus it is advisable to reserve a designated area in buffer store 6 for each information type. This can be done in such a manner that one part of buffer store 6 is provided only for one information type and the remaining part is provided only for the other type. In the case of such rigid division, the boundary between the two parts may not be optimal. For this reason it is advisable to provide two boundaries, thus dividing the buffer store 6 into three parts of zones. A first zone which is exclusively reserved for the L type, a second zone which is exclusively reserved for the C type, and a remaining part in which the two information types can overlap. In the overlapping zone the storage space adapts itself automatically as a result of the joint use of the control elements of buffer store 6 and in particular of buffer address array 10 and replacement array 12. The storage space is allocated in accordance with the respective ratio of the access rates and the hit probability (HIT signals). In the case of back-up stores 2 and 4 working at different speeds, for example, as a result of different technologies or different sizes, or in the case of the buses between the back-up stores and the buffer stores operating at different speeds, the self-adapting operation may lead to one information type monopolizing the overlapping zone. An imbalance between the information types is avoided in that, in addition to the overlapping area, separate zones are reserved for them.

The two registers 16 and 18 serve to define the boundaries of said zones. In the case of full associativity of buffer store 6, specific buffer store addresses acting as boundaries and loaded into said registers. In the case of the 4-way associativity shown in FIG. 2 the operation of the arrangement can be considerably simplified by loading the maximum permissible column number per row for the information type L into the L register 16 and the maximum permissible column number per row for the information type C into the C register 18. With the layout as provided comprising four columns, registers 16 and 18 have a capacity of 2 bits each. If the space of buffer store 6 is used jointly, i.e., in an overlapping manner, by both information types, a binary "11" is stored in each of the two registers 16, 18. If, on the other hand, buffer store 6 is shared equally by each of the two information types, i.e., if an area of a particular number from two different L type data blocks can be stored in two columns of the buffer store and two areas of the same number from two other C type information blocks can be stored in the remaining two columns, registers 16 and 18 contain the binary numer 01 and 01. By suitably selecting the limit values stored in registers 16 and 18 care is taken that the space of the buffer store 6 is used in a fully or partly overlapping or a strictly separated manner.

This observance of the zone boundaries or limit values in buffer store 6 may have various consequences when a data area or partition is replaced. If, for example, when an area has to be replaced the column quota allotted to the respective information type has been used up in full, only a data area of the same type must be replaced. If, on the other hand, the quota allotted has not been used up in full, a random data rea, i.e., also a data area of the other type, can be replaced.

The logic shown in the righ t part of FIG. 2 allows this selective operation when a data area is replaced. The signal L/C supplied by field 24a is transferred via line 25 to input C of a counter 52 and is applied in inverted form to input L of the counter via inverter 44.

Counter 52 counts the L/C bits stored in the four columns of the buffer address array 10 according to zeroes and ones. In the present embodiment the value 0 was selected for the L type and the value 1 for the C type. The four bits L/C-0 to L/C-3 read from the line of array 10 addressed by the area address are fed via line 68 to counter 52. Depending upon whether the signal 1 is applied to its C or L input, counter 52 counts the C bits (i.e., the ones) or the L bits (i.e., the zeroes). The count is then binarily coded by coder 54 and compared with the output signal of an OR gate 50 in a comparer 56. This OR gate receives a 2-bit input signal from L register 16 or C register 18, depending upon whether the value 0 or 1 is stored in field 24a of the buffer store address and AND gate 46 or 48 is open. The output signal 98 of comparer 56 has the value 1 when the number stored in register 16 or 18 exceeds or is equal to the number supplied by counter 52. As the counter 52 counts the true number of the respective L/C bits and the number stored in registers 16 and 18 is lower by 1 than the true number of columns allotted, and since, furthermore, the columns are referred to as 0 to 3, a 1 on the output of comparer 56 indicates that the allotted quota has not been used in full for the respective information type. In this case it is also possible to replace a data area or partition of the other information type. To this end the column number stored in column 12a is preferably provided for replacement, since this column number, as described above in connection with FIG. 6, refers either to the oldest or the least recently used entry.

In the case of a MISS signal on output 80 of comparer 20, the column number in column 12a of the replacement array 12 is transferred via inverter 34, AND gate 36, and line 72 to AND gate 62. If simultaneously a signal 1 from comparer 56 is applied to the other input of AND gate 62, this column number is transferred to buffer address array 10 via OR gate 64 and line 74. Logic 14 shown in FIG. 1 ensures that in array 10 in the line addressed by the area address the block address is read from the column specified via line 74 and is used to transfer the area defined by the area address in field 24c back to the back-up stores 2 or 4. Simultaneously, the replacement column number found is fed to OR gate 32 and thus to buffer store address register 22. If the data concerned are, for example, user data, the data area addressed in the manner described above is read from the buffer store and is transferred back to back-up store 2 by means of the block address found. The update and replacement logic 38 updates the corresponding line in replacement array 12 via line 70 after the replacement step has been completed. To control the necessary data transfer step as well as the read and write operations in general signal 76 can be used.

If comparer 56 supplies a 0 output signal on line 98, i.e., if the allotted quota has been used up in full for the respective information type, only a data area of the information type concerned may be provided for replacement. In addition, that area of the areas associated with the type concerned must be selected whose turn it is according to the replacement algorithm used.

The decoder and selection circuit 40 and the priority circuit 42 are essentially used to make this selection.

Figure 4:
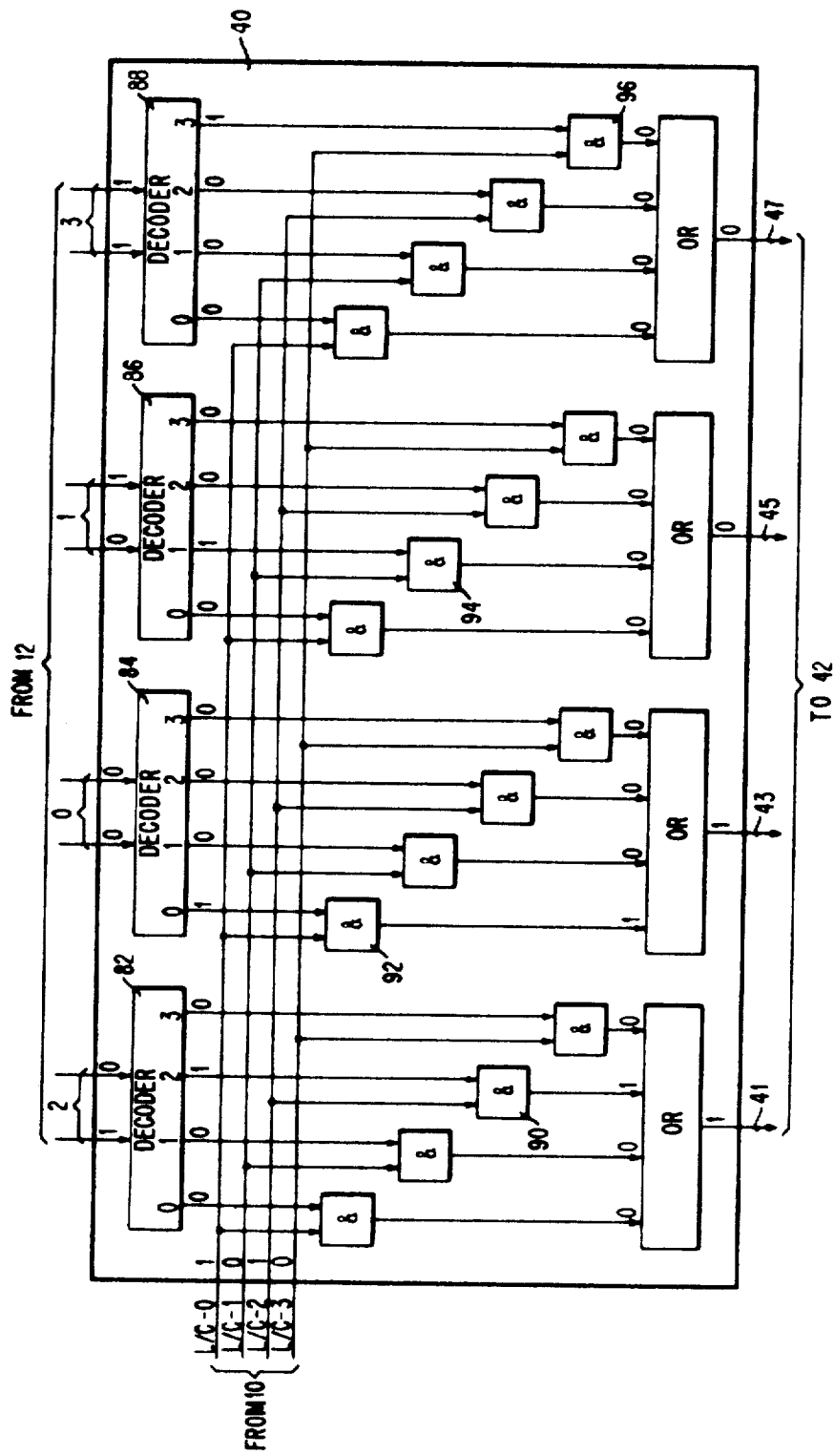
FIG. 4 shows a decoder and selection circuit.

The decoder and selection circuit 40 which is described in detail in FIG. 4, receives the column numbers stored in columns 12a to 12d of the replacement array 12 as input signals. In addition, said decoder and selection circuit receives the four L/C bits L/C-0 to L/C-3 from the four columns of a line in address array 10 via line 66. Circuit 40 serves to gate the L/C bit signal X to the output of circuit 40 in that column in which column number X is stored in array 12. In the example chosen in FIG. 2 column numbers 2, 0, 1, and 3 are stored left to right in the first line of replacement array 12. Thus circuit 40 connects bit L/C-2 on the far left in the first column 12a to the output, since column number 2 is stored in column 12a. In the second column, from left to right, bit L/C-0 in the third column bit L/C-1, and in the fourth column bit L/C-3 is connected to the output, from where these bits are fed to the input of the priority circuit 42. If bits L/C-0 to L/C-3 have the values 1, 0, 1, 0, as indicated on the left in FIG. 4, signals 1100 appear on outputs 41, 43, 45, 47 of circuit 40.

Priority circuit 42, shown in detail in FIG. 5, serves to choose from the L or C type column numbers stored in replacement array 12 in the line addressed by the area address the left-most number, i.e., the column number indicating the column to be replaced in accordance with the respective replacement algorithm, and to subsequently feed it to the output. To this end output signals 41, 43, 45 and 47 of circuit 40, which identify the data type of the column numbers, are applied as input signals to priority circuit 42. Also applied to said priority circuit are the column numbers proper which are stored in the respective line replacement array 12, as well as the L/C bit of the buffer store address in register 24.

The operation of the decoder and selection circuit may be seen from the logic elements shown in FIG. 4 and need not be described in detail. A decoder 82 to 88 converting the 2-bit binary input signal into a 1 out of 4 signal is provided for each column. For each column four AND gates are provided, of which only one can be switched through, since a binary 1 is emitted only on one of the four outputs of the decoder 82–88. In FIG. 4 these AND gates are designated as 90 to 96. Of these four AND gates only AND gates 90 and 92 are switched through, since a binary 1 is available also on the second input of these two gates. These two binary signals are associated with bits L/C-2 and L/C-0. The output signals of these two AND gates 90 and 92 are fed to outputs 41 and 43 of circuit 40 via OR gates.

Figure 5:
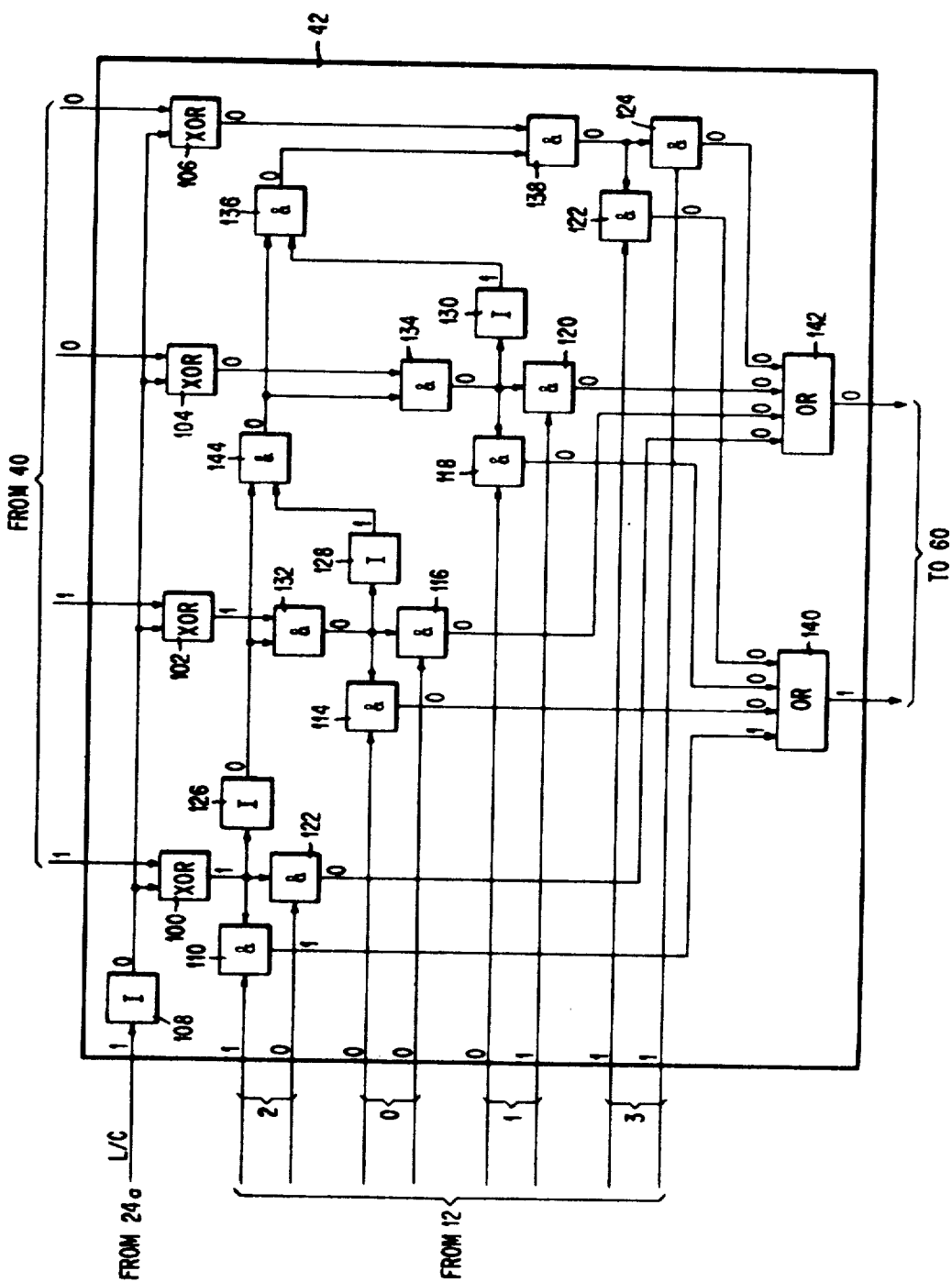
FIG. 5 shows a priority circuit.

One embodiment of the priority circuit is shown in FIG. 5. The operations of this circuit may also be seen from the logic elements shown and need not be described in detail. The EXCLUSIVE-OR gates 100 to 106 combine the output signals from lines 41, 43, 45 and 47 with the value of the L/C bit. In FIG. 5 it is assumed that the value of this bit is 1, that means that type C is required. This bit is inverted via an inverter 108. On the left side priority circuit 42 receives the column numbers read from the corresponding line in replacement array 12. In the example shown the numbers 2, 0, 1 and 3 are stored in the first line of array 12, which is to be considered here. These numbers are applied top to bottom to the inputs of priority circuit 42. As mentioned above, circuit 42 is to generate priority signals, with the highest priority signal occurring on the left and the lowest priority signal occurring on the right of said circuit. Of the L or C type information entries to be considered, the left-most one is to be selected. This is effected by means of the circuit shown in FIG. 5, using inverters 126, 128 and 130 in connection with AND gates 132, 144, 134, 136 and 138. For each of the two bits of a column number AND gates 110 to 124 controlled by EXCLUSIVE-OR gates 100-106 are additionally provided. Two OR gates 140 and 142 with four inputs each connect the eight outputs of the eight AND gates 110 to 124 to two outputs of the circuit, so that in this binary notation one of the four columns can be provided for replacement.

In the embodiment shown in FIG. 5 the priority circuit 42 receives the input signals 1100 from selection circuit 40, thus indicating that columns 12a and 12b contain the numbers of columns from buffer address array 10, in which data type C block addresses are stored. The two column numbers stored are 2 and 0 from left to right, and since each of the two bits L/C-2 and L/C-0 is 1 according to FIG. 4, this means that type C information is stored in these columns. Columns 12c and 12d contain the column numbers 1 and 3 which relate to columns with an L type block address.

In the embodiment shown in FIG. 5 the L/C bit originating from field 24a has the value 1. Thus type C information is required, so that it is the task of the priority circuit to select the left-most entry from the C type entries in replacement array 12. As column numbers pertaining to type C are contained in columns 12a and 12b, the entry in column 12a is fed from the priority circuit to the output. This entry has the value 2.

This column number 2 is fed via line 78 to a first input of an AND gate 60 in FIG. 2, whose second input is fed from the output of an inverter 58. The input of this inverter 58 is connected to output 82 of comparer 56. If comparer 56 emits an output signal 0 indicating that the allotted quota has been used up in full for the information type required, inverter 58 applies an output signal to AND gate 60. The third input to AND gate 60 is connected to the output of inverter 34 via line 35, thus receiving a binary signal when comparer 20 emits a MISS signal. Subsequently, the number of the column to be replaced is received on the output of OR gate 64 and is transferred to the elements concerned in the manner described above. Then control 14 replaces the indicated area in the buffer store by the one required, updating buffer address array 10 and replacement array 12.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A microprogrammed data processing system including a processor said system having a first main storage device for storing user data and micro instructions defined as L data and a second main storage device for storing micro instructions defined as C data the improvement comprising:

a. a buffer storage device having data storage space less than either said L information main store and C information main store and commonly connected between each of said main stores and the processor;

b. a buffer address array for storing block addresses of the data available in the buffer store each block address including an L or C indicator dependent on whether the related stored data is L or C data;

c. an address register for receiving address signal representations from said processor of the data item required by said processor, each address signal including a representation of the block of data desired, an associated L/C representation indicating whether the block is L or C data, and area address portions;

d. means responsive to said address register representation for interogating said buffer address array to determine if the block address of data specified in the address register is in the buffer store and for generating a HIT signal if the block address is present or a MISS signal if the matching block address is not present in the buffer array, and also generating a coded block signal representation;

e. buffer store address means responsive to a HIT signal, said area address portions in said address register and said coded block signal representable for reading the corresponding L or C buffer storage data item out to a buffer data register for utilization by said data processor;

f. a replacement array storing indications of the sequence in which data in said buffer array are to be replaced;

g. and control logic responsive to said MISS signal indicating the desired data item is not in said buffer store for transferring the desired data item resident in said L or C main storage to an available storage slot in said buffer store as determined by said replacement array for utilization by said buffer and further inserting block address data of said transferred data item into said buffer address array to indicate that said data is now resident in the buffer store and available for future access.

2. A data processing system in accordance with claim 1 further characterized by:

buffer storage space allocation means including a first limit address registering and control means for representing the limit of said buffer storage available for L information, and a second limit address registering and control means for representing the limit of said buffer storage available for C information, said limit address registering and control means being loaded with desired limit value representations under processor control; and that in the two limit address and registering means the maximum number of columns permissable for each data type is stored in such a manner that the buffer store areas allotted to the two L and C data types can be fully overlapping, partly overlapping or be fully separate in said buffer.

3. A microprogrammed data processing system including a processor, said system having a first main storage device for storing user data and micro instructions defined as L data and a second main storage device for storing micro instructions defined as C data, the improvement comprising:

a. a buffer storage device having data storage space less than either said L information main store and C information main store and commonly connected between each of said main stores and the processor, said buffer being organized in N columns and M rows;

b. a buffer address array for storing block addresses of the data available in the buffer store each block address including an L or C indicator dependent on whether the related stored data is L or C data, said array being similarly organized to said buffer in N columns and M rows, with a block address and L/C indicator being stored in each column of each row;

c. a replacement array also organized in N columns and M rows and storing in each column of each row the number of a column of the buffer address array, the numbers being stored from right to left in the columns of said replacement array in accordance with a predetermined replacement algorithm, with the number of the least recently accessed column of the buffer array said number being stored in the leftmost column store of said replacement array, the common organization of said buffer storage, buffer address array, and replacement array in N columns and M rows providing N way associativity therebetween;

d. an address register for receiving address signal representations from said processor of the data items required by said processor, each address signal including a block address section, a L/C indicator, and a data area representation;

e. means responsive to an area address respresentation in said address register for selecting a corresponding row of each said buffer address array, buffer store and replacement array;

f. a comparer means for comparing each block address and L/C indicator represented in each column of the selected row of said buffer array to the desired block address from said address register, said comparer generating a HIT signal if a desired match is obtained and a column indication signal of the column in said buffer array which generated the HIT signal;

g. means responsive to said column indication signal for selecting the related column of said buffer storage device to read out the data at the intersection of said column and the previously selected row to said data processor for utilization thereof; and h. update and selection logic responsive to the stored column data in each of the N columns of the selected row of the replacement array and to said HIT signal, for shifting all of said stored column numbers in said row to the left and inserting said column indication signal in the rightmost column of the row to indicate that column number as the most recently used column.

4. A microprogrammed data processing system including a processor, said system having a first main storage device for storing user data and micro instructions defined as L data and a second main storage device for storing micro instructions defined as C data, the improvement comprising:

a. a buffer storage having a data storage space less than either said L information main store and C information main store and commonly connected between each of said main stores and the processor, said buffer being organized in N columns and M rows;

b. a buffer address array for storing block addresses of the data available in the buffer store, each block address including an L or C indicator dependent on whether the related stored data is L or C data, said array being similarly organized to said buffer in N columns and M rows, with a block address and L/C indicator being stored in each column of each row;

c. a replacement array also organized in N columns and M rows and storing in each column of each row the number of a column of the buffer address, the stored column numbers in each row selected being representative in a predetermined replacement algorithm of the order for replacement of the data in the related columns of the associated selected row of the buffer array, if replacement of data is found to be necessary;

d. an address register for receiving address signal representations from said processor of the data items required by said processor, each address signal including a block address section, a L/C indicator, and a data area representation;

e. means responsive to an area address representation in said address register for selecting a corresponding row of each said buffer address array, buffer store and replacement array;

f. a comparater means for comparing each block address and L/C indicator represented in each column of the selected row of said buffer array to the desired block address from said address register, said comparer generating a HIT signal if a desired match is obtained and a column indication signal of the column in said buffer which generated the HIT signal;

g. means responsive to said column indication signal for selecting the related column of said buffer storage device to read out the data at the intersection of said column and the previously selected row to said data processor for utilization thereof; and h. update and selection logic responsive to the stored column data in each selected row of the replacement array and to said HIT signal for updating the columnar represented replacement indications therein in accordance with the current buffer store readout operations.

5. A microprogrammed data processing system including a processor, said system having a first main storage device for storing user data and micro instructions defined as L data and a second main storage device for storing micro instructions defined as C data, the improvement comprising:

a. a buffer storage device having data storage space less than either said L information main store and C information main store and commonly connected between each of said main stores and the processor, said buffer being organized in N columns and M rows;

b. a buffer address array for storing block addresses of the data available in the buffer store each block address including an L or C indicator dependent on whether the related stored data is L or C data, said array being similarly organized to said buffer in N columns and M rows, with a block address and L/C indicator being stored in each column of each row;

c. a replacement array also organized in N columns and M rows and storing in each column of each row the number of a column of the buffer address array, the stored column numbers in each row when selected being representative in a predetermined replacement algorithm of the order for replacement of the data in the related columns of the associated selected row of the buffer address array, if replacement of data in the buffer store is found to be necessary;

d. an address register for receiving address signal representations from said processor of the data items required by said processor, each address signal including a block address section, a L/C indicator, and a data area representation;

e. means responsive to an area address representation in said address register for selecting a corresponding row of each said buffer address array, buffer store and replacement array;

f. a first comparer means for comparing each block address and L/C indicator in each column of the selected row of said buffer array to the desired block address from said address register, said comparer generating either a HIT or MISS signal indication, a HIT indicating a match of block addresses has been found and effecting a selection of the related N columns of the buffer to readout the desired data area on the previously selected row of the buffer store to said processor for utilization thereby, said MISS signal indicating the desired data is not in the buffer store and a replacement operation is required to bring the data from the related designated L/C main store to the buffer store for transfer to the data processor;

g. buffer storage space allocation means including an L (data) limit register and control means for representing the limit of columns of said buffer storage available for L information and a C (data) limit register and control means for representing the limit of columns of said buffer storage available for C information, said limit registers being loaded with desired limit values under processor control, and each being selectable for control in accordance with the status of said L/C indicator in said address register;

h. a counter selectably operable under control of the L/C indicator in said address register to count either the L indicators or C indicators of the related block addresses in the selected line of the buffer address array;

i. second comparing means for comparing signals representative of the stored value in the selected L or C limit register and the related L or C count in said counter to generate a first signal indicating the counted L or C indicators do not exceed the related limit register value and denoting that the columnar storage quota of the buffer store for the designated L or C data has not been exceeded;

j. and control means responsive to said first signal and said MISS signal for reading out the stored column number in a predetermined column of the select row of the replacement array to said buffer address register to select a corresponding column of said buffer store array corresponding to said stored column number which in conjunction with said row thereof previously selected in accordance with said address register operation renders the related buffer storage area available for replacement from said back up store, said stored column number also being effective to control said buffer address array to store the block address of the replaced data item.

6. A microprogrammed data processor as in claim 5 further characterized in that said second comparing means is adapted to generate a second signal when the counted L or C indicator does exceed the related limit register value and denoting that columnar buffer storage for that type of data has been used in full and only a data area of the buffer of the same L or C type should be provided for replacemnt;

said control means being responsive to said second signal and said MISS signal for reading out the stored column number in a predetermined column of the selected row of the replacement array for initiating the data replacement, and for updating the buffer address array, and the replacement array.

7. A microprogramed data processing system including a processor, said system having a first main storage device for storing user data and micro instructions defined as L data and a second main storage device for storing micro instructions defined as C data, the improvement comprising:
   a. a buffer storage device having data storage space less than either said L information main store and C information main store and commonly connected between each of said main stores and the processor, said buffer being organized in N columns and M rows;
   b. a buffer address array for storing block addresses of the data available in the buffer store each block address including an L or C indicator dependent on whether the related stored data is L or C data, said array being similarly organized to said buffer in N columns and M rows, with a block address and L/C indicator being stored in each column of each row;
   c. a replacement array also organized in N columns and M rows and storing in each column of each row the number of a column of the buffer address array, the stored column numbers in each row when selected being representative in a predetermined replacement algorithm of the order for replacement of the data in the related columns of the associated selected row of the buffer address array, if replacement of data in the buffer store is found to be necessary;
   d. an address register for receiving address signal representations from said processor of the data items required by said processor, each address signal including a block address section, a L/C indicator, and a data area representation;
   e. means responsive to an area address representation in said address register for selecting a corresponding row of each said buffer address array, buffer store and replacement array;
   f. a first comparer means for comparing each block address and L/C indicator in each column of the selected row of said buffer array to the desired block address from said address register, said comparer generating either a HIT or MISS signal indication, a HIT indicating a match of block addresses has been found and effecting a selection of the related N column of the buffer to readout the desired data area on the previously selected row of the buffer store to said processor for utilization thereby, said MISS signal indicating the desired data is not in the buffer store and a replacement operation is required to bring the data from the related designated L/C main store to the buffer store for transfer to the data processor;
   g. buffer storage space allocation means including an L (data) limit register and control means for representing the limit of columns of said buffer storage available for L information and a C (data) limit register and control means for representing the limit of columns of said buffer storage available for C information, said limit registers being loaded with desired limit values under processor control, and each being selectable for control in accordance with the status of said L/C indicator in said address register;
   h. a counter selectably operable under control of the L/C indicator in said address register to count either the L indicators or C indicators of the related block addresses in the selected line of the buffer address array;
   i. second comparing means for comparing signals representative of the stored value in the selected L or C limit register and the related L or C count in said counter to generate a first signal indicating the counted L or C indicators do not exceed the related limit register value and denoting that the columnar storage quota of the buffer store for the designated L or C data has not been exceeded and a second signal when the counted L or C indicators do exceed the related limit register value;
   j. a decoder and selection circuit with N columns for generating outputs signals indicating the respective information type (L or C) associated with the column numbers stored in the respective columns of the selected row of the replacement array;
   k. a priority circuit responsive to the output signals supplied by said decoder and selection circuit and said L/C indicator supplied by the processor, said priority circuit determining that column number stored in the selected row of the replacement array which is of the L or C type required and which denotes the next column to be replaced;
   l. update and replacement logic means operable after any utilization of said replacement array in a data replacement operation to update the columns of the selected row of the array in accordance with a predetermined replacement algorithm;
   m. and control logic responsive to said MISS signal, said priority circuit, and said second comparing means second signal, for initialing the data replacement and updating the buffer address array and the replacement array.

8. A microprogrammed data processor as in claim 7 further characterized in that said update and replacement logic means functions in a FIFO (First In/First Out) replacement algorithm which puts the column number stored in the replacement array in the selected row in the leftmost column at the end of a chain in the rightmost column position and shifts the remaining column numbers to the left.

9. A microprogrammed data processor as in claim 7 further characterized in that said update and selection logic means functions in a LRU (Least Recently Used) algorithm which puts the addressed column number at the end of the chain, left shifting the column numbers further on the right in such a manner that when the quota allotted for an information type has not been used up in full as indicated by said first signal, the column number in the leftmost column number is provided for replacement and when the quota allotted has been used up in full as indicated by said second signal, the leftmost column number of the respective (L or C) information type is provided for replacement.

* * * * *